(12) United States Patent
Morone

(10) Patent No.: US 11,255,385 B2
(45) Date of Patent: Feb. 22, 2022

(54) CLUTCH, IN PARTICULAR FOR A MOTORCYCLE, WITH PRESSURE PLATE AND CENTRIFUGAL ASSEMBLY

(71) Applicant: ENDURANCE ADLER S.P.A., Rovereto (IT)

(72) Inventor: Alfio Morone, Rovereto (IT)

(73) Assignee: Endurance Adler S.p.A., Rovereto (IT)

( * ) Notice: Subject to any disclaimer, the term of this patent is extended or adjusted under 35 U.S.C. 154(b) by 0 days.

(21) Appl. No.: 16/767,054

(22) PCT Filed: Nov. 27, 2017

(86) PCT No.: PCT/EP2017/080490
§ 371 (c)(1),
(2) Date: May 26, 2020

(87) PCT Pub. No.: WO2019/101342
PCT Pub. Date: May 31, 2019

(65) Prior Publication Data
US 2020/0370605 A1 Nov. 26, 2020

(51) Int. Cl.
*F16D 13/75* (2006.01)
*F16D 43/12* (2006.01)
(Continued)

(52) U.S. Cl.
CPC ........... *F16D 13/757* (2013.01); *F16D 13/70* (2013.01); *F16D 13/585* (2013.01); *F16D 43/12* (2013.01);
(Continued)

(58) Field of Classification Search
CPC ..................................................... F16D 43/12
See application file for complete search history.

(56) References Cited

U.S. PATENT DOCUMENTS 2,529,014 A * 11/1950 Goldberg ............. A01D 34/475
56/10.3
3,291,274 A * 12/1966 Wyman ................... F16D 43/10
192/105 C
(Continued)

FOREIGN PATENT DOCUMENTS

DE 202017001286 U1 3/2017
EP 1772642 A1 4/2007
(Continued)

OTHER PUBLICATIONS

International Search Report issued in connection with PCT/EP2017/080490.
(Continued)

*Primary Examiner* — David R Morris
(74) *Attorney, Agent, or Firm* — Akerman LLP

(57) ABSTRACT

A clutch (100) having: a fixed hub (201), a movable hub (202), a plurality of discs (204). The fixed hub (201) and the movable hub (202) axially slide, getting farther or closer so as to transmit a variable axial load onto the discs (204). The clutch (100) has a pressure plate assembly (208) including a centrifugal assembly (210), having: a rotatable mass holder (211) and a plurality of mass elements (212) radially disposed. Each mass element (212) has a pivot (301) and is configured for a displacement (1002) by pivoting under centrifugal effects. The mass elements (212) are configured for bringing the movable hub (202) closer to the fixed hub (201), so as to increase the variable axial load and allowing the clutch (100) (automatic) engagement. Each mass element (212) has a main body (302) and a column element (303) which connects the pivot (301) with the main body (302).

14 Claims, 10 Drawing Sheets

(51) Int. Cl.
*F16D 13/70* (2006.01)
*F16D 13/58* (2006.01)
*F16D 13/56* (2006.01)

(52) U.S. Cl.
CPC .. *F16D 2013/565* (2013.01); *F16D 2013/706* (2013.01)

(56) References Cited

U.S. PATENT DOCUMENTS

| | | | | |
|---|---|---|---|---|
| 4,111,291 A | * | 9/1978 | Horstman | F16D 43/10 192/105 C |
| 5,284,234 A | * | 2/1994 | Miglizzi | F16D 43/10 192/103 A |
| 5,423,406 A | * | 6/1995 | Antonov | F16H 61/0295 192/103 A |
| 6,279,711 B1 | * | 8/2001 | Fehring | F16D 43/10 192/105 C |
| 6,536,574 B2 | * | 3/2003 | Fehring | F16D 43/10 192/105 C |
| 8,459,430 B2 | | 6/2013 | Youngwerth et al. | |
| 8,607,953 B2 | * | 12/2013 | Morone | F16D 43/12 192/70.252 |
| 2001/0045336 A1 | * | 11/2001 | Fehring | F16D 43/10 192/105 C |
| 2008/0099300 A1 | | 5/2008 | Youngwerth et al. | |
| 2011/0083934 A1 | * | 4/2011 | Morone | F16D 43/12 192/70.11 |
| 2015/0369305 A1 | | 12/2015 | Youngwerth et al. | |

FOREIGN PATENT DOCUMENTS

| | | |
|---|---|---|
| EP | 2400177 A1 | 12/2011 |
| GB | 310783 A | 4/1929 |
| GB | 995989 A | 6/1965 |
| TW | 201323741 A | 6/2013 |

OTHER PUBLICATIONS

Written Opinion of the International Searching Authority issued in connection with PCT/EP2017/080490.

\* cited by examiner

CLUTCH, IN PARTICULAR FOR A MOTORCYCLE, WITH PRESSURE PLATE AND CENTRIFUGAL ASSEMBLY

CROSS-REFERENCE TO RELATED APPLICATIONS

This application is a national phase of PCT/EP2017/080490, filed Nov. 27, 2017, the entire contents of which is hereby incorporated by reference.

FIELD OF THE INVENTION

The present invention relates to a clutch; in particular, the invention concerns a clutch with pressure plate and centrifugal assembly, which allows automatic engagement depending on the rotational speed of the engine. The present invention can be applied in particular to motorcycle clutches.

In general, the invention pertains to the field of clutches for vehicles, which allow engagement and disengagement of torque transmission from the engine to at least a wheel.

BACKGROUND ART

Recently, automatic clutches for high-performance motorcycles have become available. Automatic clutches for high-performance motorcycles have many advantages over manual clutches.

Document US2008099300 (A1) relates to a clutch with automatic centrifugal engagement of a pressure plate. The pressure plate includes radially positioned ramps, having centrifugal actuating members, i.e. a plurality of spheres, disposed between the pressure plate and a top friction plate. The spheres move outwards due to centrifugal effect for rotation of the clutch, and act on the pressure plate to cause clutch engagement.

Document U.S. Pat. No. 8,459,430 (B2) relates to a clutch with automatic centrifugal engagement, incorporating an expanding friction disk that expands when rotated above a threshold speed. The expanding friction disk assembly is designed to replace friction disks in a multi-plate clutch pack, and includes centrifugal wedges which slide radially outward against ramps of a bottom plate, under centrifugal effects.

Document US2015369305 (A1) relates to an expanding clutch disk, which is placed among friction disks in a clutch basket in order to change the thickness of the expanding disk based on the RPMs of the engine. Under higher RPMs, centrifugal actuating members press towards the periphery of the expanding disk; the movement of these members pushes first and second plate apart.

Document EP2400177 (A1) in the name of Adler S.p.A. relates to a clutch with an automatic-engagement device, provided at the same time with a manual operation device. The clutch includes a centrifugal assembly, wherein rotatably coupled masses are subject to a displacement under centrifugal effects and cooperate with a pressure ring, to cause an axial compression of a disk pack, thereby achieving an engaged condition of the clutch.

Prior art solutions allow automatic centrifugal engagement and disengagement of a motorcycle clutch.

Nonetheless, smoother functioning of an automatic clutch shall be achieved for a proper riding experience. In that, prior art solutions remain in need for a smooth engagement in a wider range of rotational speeds, and torque transmission in automatic centrifugal clutches for motorcycles could be further optimized.

For example, a behavior of a clutch during automatic engagement could remain different from a behavior of the same clutch during automatic disengagement, thus hindering user's driving/riding experience. This difference in behavior of the clutch, for engaging/disengaging, could become even worsened when the friction discs become worn.

SUMMARY OF THE INVENTION

An object of the present invention is to solve problems of the prior art.

A particular object of the present invention is to provide a clutch which allows a smooth functioning and a great driving/riding experience.

A further object of the present invention is to provide a clutch with automatic centrifugal engagement and disengagement, which optimizes torque transmission also during transitions from low to high engine speeds, and from high to low engine speeds.

A further object of the present invention is to provide a clutch which is optimally functional, both in an automatic and in a manual mode.

A further object of the present invention is to provide a clutch which is reliable in operation.

A further object of the present invention is to provide a clutch which has compact size, while still integrating a fully-functional centrifugal assembly.

A further object of the present invention is to provide a clutch which can be rationally assembled.

These and other objects are obtained by a clutch as defined in the appended claims, which form integral part of the present disclosure.

An underlying solution of the present invention is a clutch comprising: a housing rotatable around an axis of rotation; a fixed hub internal to the housing and configured for coupling with a shaft coaxial to the axis of rotation; a movable hub axially mounted along the axis of rotation onto the fixed hub and configured to rotate jointly with the fixed hub; a plurality of discs interposed between the fixed hub and the movable hub, wherein the fixed hub and the movable hub are configured to axially slide, getting farther or closer to each other so as to transmit a variable axial load onto the plurality of discs, thereby selectively transmitting a torque from the housing to the shaft.

The clutch further comprises a pressure plate assembly for controlling the variable axial load, which includes a centrifugal assembly, comprising: a mass holder configured to rotate jointly with the housing, and plurality of mass elements radially disposed in the mass holder around the axis of rotation; each mass element comprises a pivot and is configured for a displacement under centrifugal effects by pivoting around the pivot, in particular when the clutch is rotated in the engine.

The mass elements, during the displacement under centrifugal effects, are configured for exerting an axial thrust within the pressure plate assembly, to bring the movable hub closer to the fixed hub, so as to increase the variable axial load, in particular engaging the clutch for torque transmission.

In the clutch with the centrifugal assembly, each mass element comprises a main body and a column element, which connects the pivot with the main body.

With the configuration of the mass element having a main body and a column element, it is possible to optimize the behavior of the centrifugal assembly, the axial thrust bringing forth the axial load, and stiffness of associated spring elements.

Moreover, advantageously, mass values of the components of the mass element, can be more effectively determined, and functioning of the clutch according to the present invention is improved.

The particular mass element's geometry is optimized for providing an effective axial thrust, which is transmitted to the movable hub for clutch engagement. In that, the mass elements of the centrifugal assembly allow engagement of the clutch, in particular in an automatic manner. In this way, not only the maximum transmitted torque is optimized, but also the automatic control of the transmitted torque during transients (i.e. starting, stopping, up-shifting, down-shifting, partialized throttle, etc.) is improved. Advantageously, the automatic centrifugal engagement and disengagement of the clutch is optimized also during transitions from different engine speeds, which either increase (by opening throttle) or decrease (by closing throttle).

The smooth functioning of the clutch according to the present invention is particularly advantageous for use in motorcycles, in particular high-performance motorcycles, allowing a great riding experience.

Preferably, the column element is substantially elongated and upright, and is configured for increasing a lever's arm and contributing to the displacement under centrifugal effects of the mass element.

Preferably, the column element defines a pivot which is radially more external than the center of mass of the main body, with respect to the axis of rotation, contributing as well to the displacement under centrifugal effects of the mass element.

Preferably, the main body comprises a step-like shape for maximizing occupied volume, so as to increase masses and centrifugal forces acting on the centrifugal assembly.

Preferably, the mass element comprises a profiled contact surface, acting on the pressure assembly, with variable curvature radius so as to exerting the axial thrust on the movable hub, and returning to a rest position when centrifugal effects cease.

In a preferred embodiment, the clutch according to the present invention comprises a pusher for manual disengagement, configured for distancing the mass holder from the movable hub thereby removing the axial load acting on the discs. Advantageously, such pusher allows a manual mode of the clutch, which remains capable of a double (automatic/manual) functioning, thereby best adapting to the rider's preferences and road conditions.

The configuration of the clutch according to the present invention is particularly advantageous as it remains compact, and as it allows switching from manual to automatic mode simply by operating the clutch lever, being as easy as for traditional vehicles with manual clutches.

Preferably, the mass holder comprises a plurality of pivot seats, which are accommodated in corresponding protruding structures, so that each column element is inserted in a protruding structure. Preferably, the clutch further comprises a clutch cover comprising a plurality of recesses, in particular through holes, for respectively accommodating the protruding structures, thereby joining rotation of the housing and the mass holder. Advantageously, a compact configuration of the clutch of the present invention, integrating a fully-functional centrifugal assembly, is achieved.

Preferably, the centrifugal assembly further comprises at least one end-movement spring interposed between the clutch cover and the mass holder; the end-movement spring is configured for partially counteracting the axial thrust of the mass elements, upon reaching a threshold of variable axial load. In this way, functioning of the clutch during engagement and disengagement can be improved for low to intermediate engine speeds, and the automatic operation of the centrifugal assembly is more reliable.

Preferably, the protruding structures can slide into the respective recesses, thereby allowing compression of the end-movement spring, while maintaining an extremely compact overall configuration of the clutch.

Preferably, the centrifugal assembly comprises setting means for regulating preload of the end-movement spring, thereby allowing to tune the clutch according to specific needs, and according to characteristics of the specific vehicle and engine provided.

Preferably, the pressure plate assembly includes a pressure plate for transmitting the variable axial load from the centrifugal assembly to the movable hub; the centrifugal assembly further comprises a plurality of axial pins, offset with respect to the axis of rotation, mounted on the pressure plate, and passing through the mass holder. These axial pins allow joint rotation of the pressure plate and of the mass holder, and further allow axial movement of the mass holder with respect to the pressure plate due to the axial thrust. Advantageously, the assembling of the clutch becomes more rational as these axial pins hold together several components of the centrifugal assembly. At the same time, operation of the clutch is improved, as the axial pins contribute to guiding the axial movement of the pressure plate during engagement and disengagement of the clutch.

Preferably, the pressure plate assembly further includes at least one return spring configured for counteracting the movement of the pressure plate, thereby improving the functioning during engagement and disengagement of the clutch, contributing to a seamless and smooth operation.

Preferably, the fixed hub and the movable hub comprise respective sliding elements, sloped according to at least one helix, which mate with each other during axial movement of the hubs. These sliding elements, when the hubs are subjected to a torque, increase or decrease the variable axial load, thus contributing to further engagement of the clutch during acceleration, and also allowing partial disengagement when required. Preferably, two separate helixes are provided for driving torque and dragging torque, so as to optimize functioning for "motoring" or "wide-open-throttle" conditions.

Further features and advantages will become apparent by the following detailed description of preferred embodiments, representing non-limiting examples of the present invention. In particular, the dependent claims define further advantageous aspects of the present invention.

BRIEF DESCRIPTION OF THE DRAWINGS

The invention is disclosed with reference to the appended drawings, provided as non-limiting examples, wherein.

In different figures, analogous elements will be indicated by analogous reference signs.

DETAILED DESCRIPTION

Figure 1:
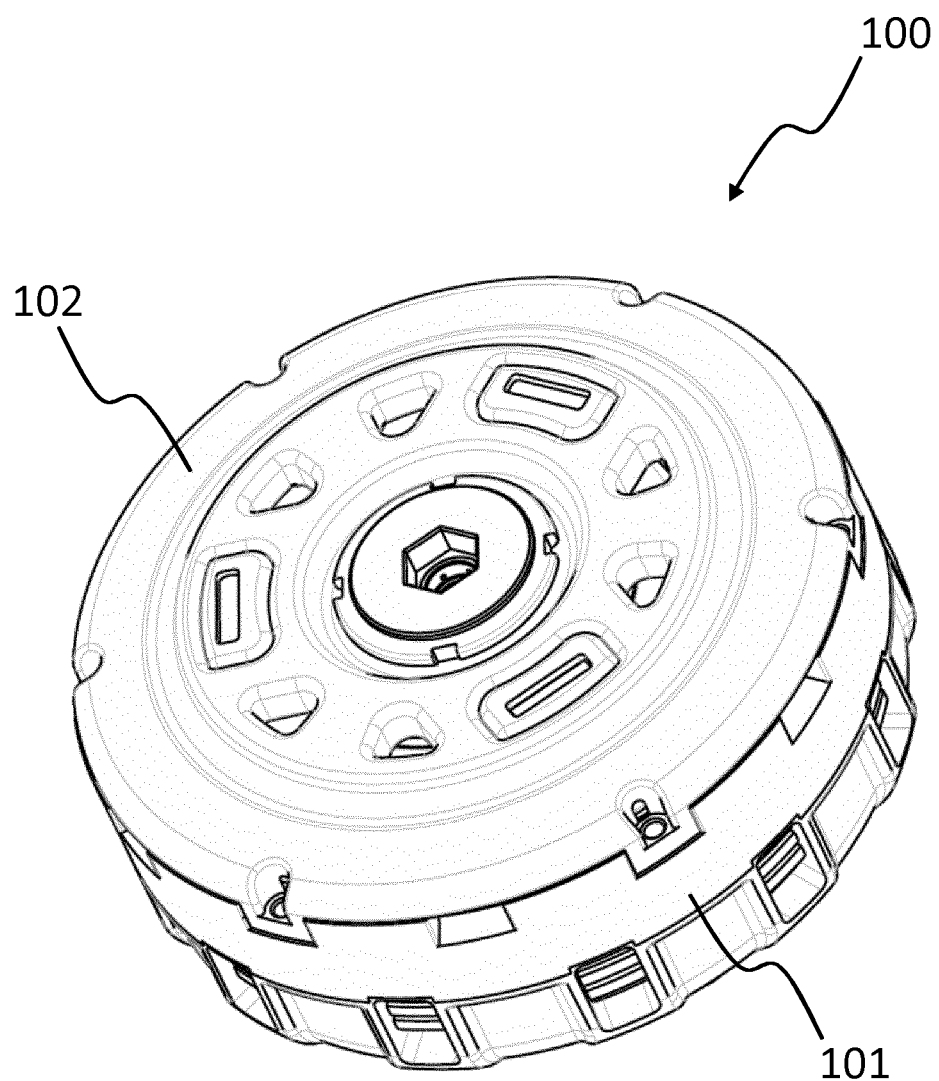
FIG. 1 shows an assembly of a clutch according to the present invention.

FIG. 1 shows an assembly of a clutch 100, in assembled state. The clutch 100 comprises a housing 101 and a clutch cover 102, which is connected to the housing 101 defining a closed-shell structure.

The clutch 100 is used to selectively command transmission of a rotatory movement and a torque, between a driving shaft and a driven shaft; in the preferred embodiment, the clutch 100 is a motorcycle clutch. Preferably, the housing 101 is connected to a driving primary gear (not shown), including a torsional damper, so as to receive a torque from an engine.

Figure 2:
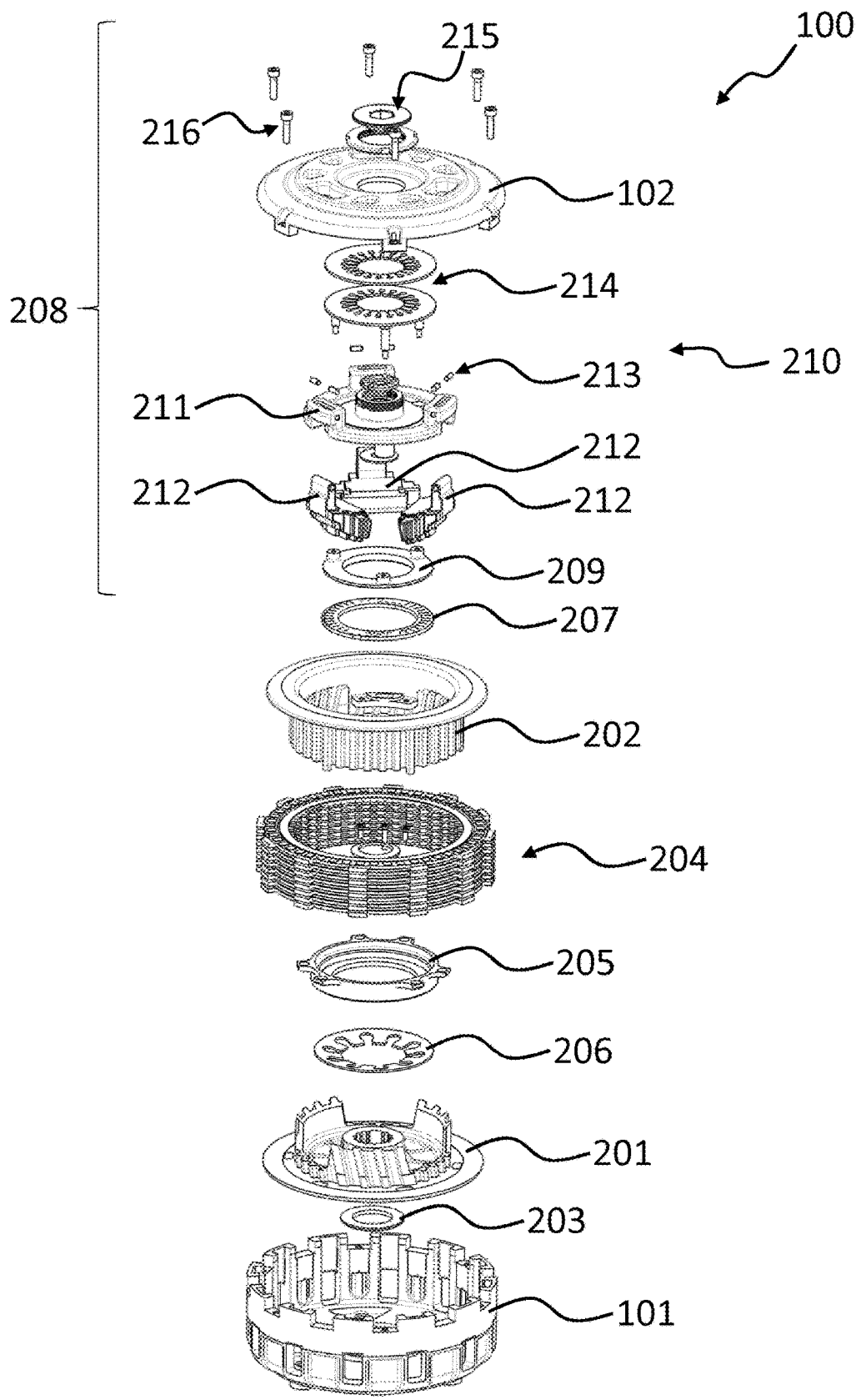
FIG. 2 shows an exploded view of the clutch of FIG. 1.

FIG. 2 shows an exploded view of the clutch 100.

The housing 101 is rotatable around an axis of rotation, along which all the other internal components of the clutch are laid. In particular, these internal components are symmetrically arranged in radial positions along a circumference having center on the axis of rotation.

The clutch 100 comprises a fixed hub 201 internal to the housing 101; the fixed hub 201 is configured for coupling to a shaft (not shown) which is coaxial to the axis of rotation of the housing 101. In that sense, the hub 201 is "fixed" in rotation together with such shaft, and its axial position with respect to shaft is also "fixed".

The rotation of the fixed hub 201 can be engaged or disengaged from the rotation of the housing 101, so as to selectively transmit a torque by the clutch 100, as it will be further described.

Preferably, an appropriate bearing, such as a roller-bearing (not shown), is inserted in the housing 101, interposed between the housing 101 and the fixed hub 201. Preferably, a spacer 203 is interposed between the fixed hub 201 and the bearing, so as to ensure appropriate fit between the housing 101 and the fixed hub 201.

The clutch 100 further includes a movable hub 202, which is mounted along the axis of rotation onto the fixed hub 201. The movable hub 202 is so shaped as to rotate jointly with the fixed hub 201, but at the same time to slide in axial direction, thereby getting farther or closer to the fixed hub. In that sense, the hub 202 is "movable" in its axial position with respect to fixed hub 201, but it is also jointly rotated together with the above-mentioned shaft so as to be adapted to transmit a torque.

The clutch 100 further comprises a plurality of discs 204 which are interposed between the fixed hub 201 and the movable hub 202. The plurality of discs 204 includes, in a known manner, a plurality of ring-like discs coated with friction material. The plurality of discs 204 consists of "driving" discs which are coupled to the housing 101, in particular by their external toothing, alternated with "driven" discs which are coupled, in particular by their internal toothing, to the outer cylindrical surface of the movable hub 202 which becomes a drawing surface.

The driven discs may receive a torque from the driving discs, and transmit it to the movable hub 202 and to the fixed hub 201, when the discs 204 are pushed together, so as to transmit a torque by friction.

To this effect, the movable hub 202 is configured to axially slide with respect to the fixed hub 201, to get farther or closer and transmit an axial load on the discs 204.

In other words, when the axial load compresses the discs 204, a torque can be transmitted, while when there is no such axial load, the discs 204 are free to relatively rotate, and no torque is transmitted by the clutch 100.

This axial load is variable and can be controlled in order to cause engagement and disengagement of the clutch, for transmission of the torque from the housing 101 to the fixed hub 201, and then to the output shaft, which is preferably a primary shaft of a gear shift system in the motorcycle.

The clutch 100 further comprises a bottom-side pressure plate 205 which is joined to the movable hub 202 in order to receive an axial thrust, as it will be further described.

The clutch 100 also comprises a return spring 206, in particular a Belleville spring or slotted disc spring, interposed between the fixed hub 201 and the bottom-side pressure plate 205, configured for counteracting the movement of the pressure plate, as it will be further described. Alternatively, one or more helical springs could be used as return spring.

The clutch 100 comprises a bearing 207 interposed between the bottom-side pressure plate 205 (joined to the movable hub), and a pressure plate assembly 208. Preferably, bearing 207 is a thrust bearing.

The pressure plate assembly 208 is configured for controlling the variable axial load acting on the moveable hub 202 and, in turn, on the discs 204, for selectively transmitting the torque.

The pressure plate assembly 208 comprises a pressure plate 209, a centrifugal assembly 210 and, preferably for compactness, also the clutch cover 102, which becomes a functional element in the system.

The centrifugal assembly 210 comprises a mass holder 211 which is configured for rotating jointly with the housing 101, in particular being constrained to the clutch cover 102.

In an alternative embodiment (not depicted) a different clutch cover could be provided with the mere function of closing the clutch assembly, while employing a dedicated component in the pressure plate assembly, to constrain the housing 101 with the centrifugal assembly 210.

The centrifugal assembly 210 further comprises a plurality of mass elements 212 radially disposed in the mass holder 211 around the axis of rotation.

As it will be further described, each mass element 212 comprises a pivot, preferably supplemented by pivot pins 213 rotatably constraining the mass element 212 to the mass holder 211.

The mass elements 212 are configured for a displacement under centrifugal effects in the centrifugal assembly 210, by pivoting around the pivots. In such displacement under centrifugal effects, the mass elements 212 are configured for exerting an axial thrust within the pressure plate assembly 208, to act on the movable hub 202 by means of the bearing 207 and the bottom side pressure plate 205, thereby bringing the movable hub 202 closer to the fixed hub 201. In other words, the mass elements 212, by pivoting for centrifugal effects, can increase the axial load acting on the discs 204, thereby engaging the clutch 100.

The centrifugal assembly 210 further comprises at least one end-movement spring 214, in particular a pair of counter-facing Belleville springs or slotted discs springs, interposed between the clutch cover 102 and the mass holder 211.

The centrifugal assembly 210 also comprises setting means 215 for regulating preload of the at least one end-movement spring 214. In particular, the setting means 215 are configured for regulating preload of the at least one end-movement spring 214, by regulating a clearance between the clutch cover 102 and the mass holder 211.

The pressure plate assembly 208 is closed by the clutch cover 102, as described, joined to the housing 101 by the screws 216.

Figure 3:
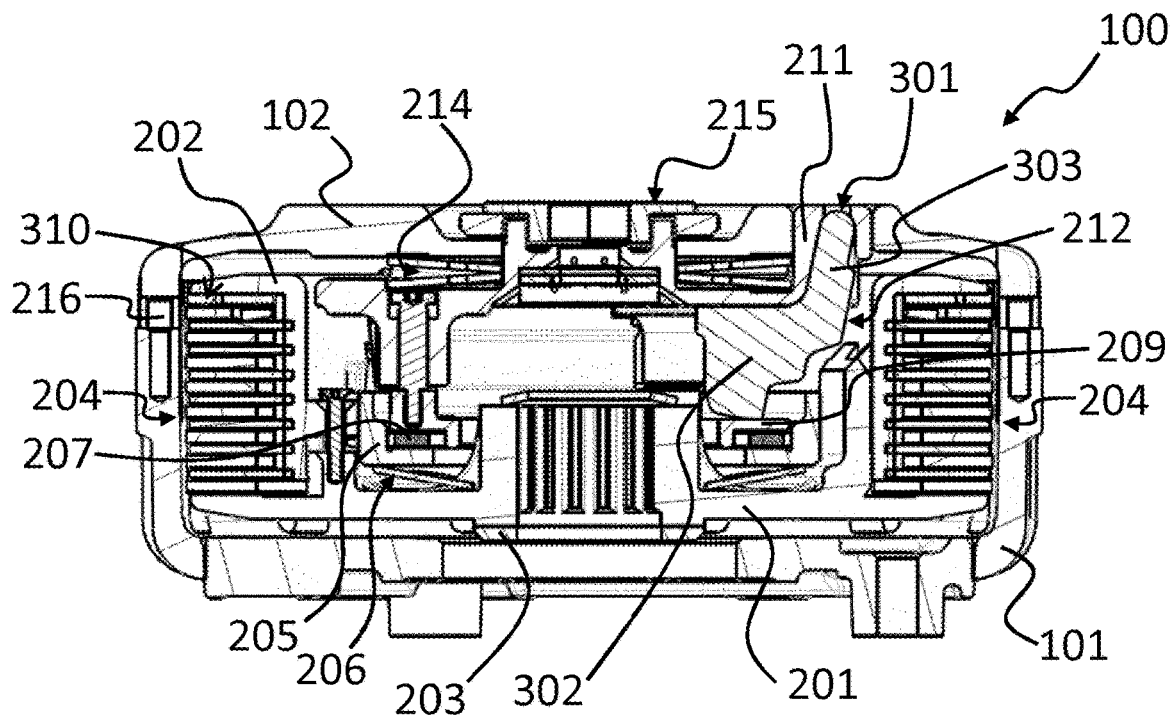
FIG. 3 shows a sectional view of the clutch of FIG. 1, in idle conditions.

FIG. 3 shows a sectional view of the clutch 100, in idle conditions. The "idle" conditions correspond to lower rotational speeds of the engine, for example in the range 1000-1400 rpm for a motorcycle, depending on engine type.

In that, the configuration of the clutch 100 in idle conditions is similar to the configuration assumed for stand-still conditions (stopped engine). In particular, the clutch 100 is disengaged when "pre-assembled", that is when the components of the clutch 100 are assembled together, but the clutch 100 is not yet mounted on the vehicle.

Each of the mass element 212 comprises a pivot 301, and is configured for a displacement under centrifugal effects by pivoting around pivot 301. Preferably, rotation pins are associated to the pivot 301 for rotation of the mass element 212. In an alternative, the curved shape of the pivot 301 itself could suffice for providing a rotational fulcrum for the mass element 212.

Each of the mass elements 212 further comprises a main body 302, and a column element 303 which connects the pivot 301 to the main body 302.

In idle conditions, the mass element 212 is radially inward in the centrifugal assembly. In particular, its inner radial surface abuts against the surface of the mass holder 211, since no centrifugal force arises. In this condition, the mass element 212 is defined as in "rest" position. In the rest position, preferably, the column element 303 is substantially vertical.

As mentioned, in idle conditions the clutch is disengaged and a gap 310 of about 1.50-1.75 mm is present between the movable hub 202 and the discs 204.

Figure 4:
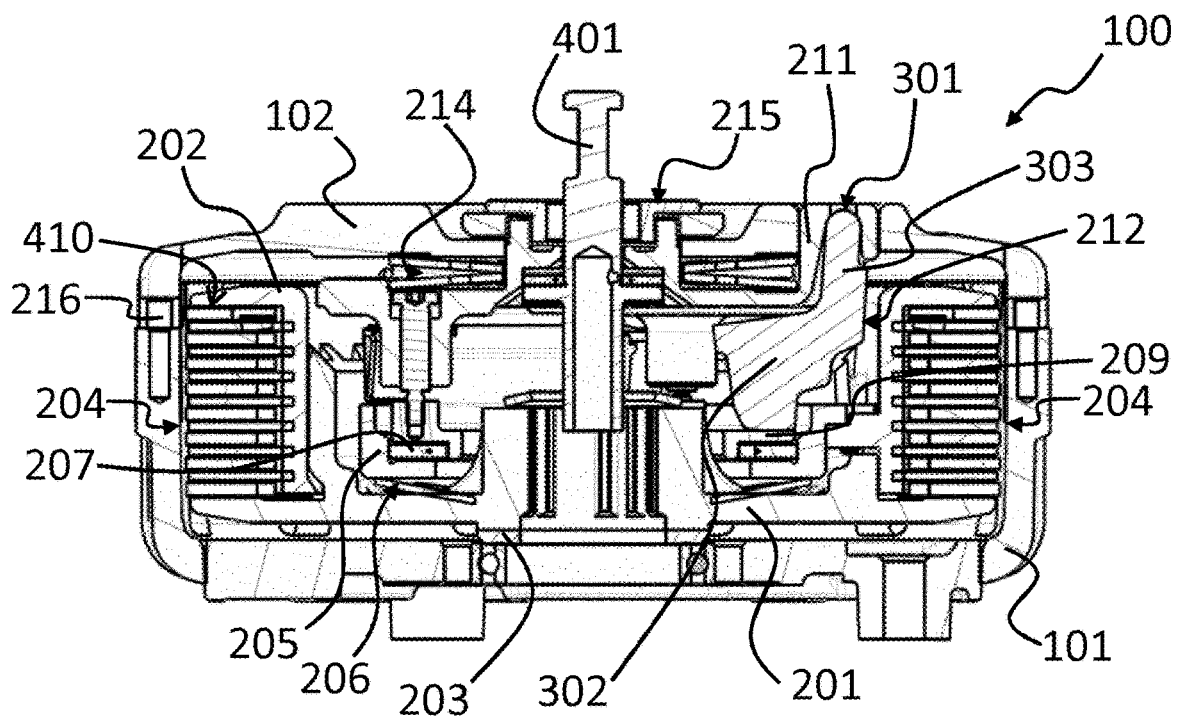
FIG. 4 shows a sectional view of the clutch of FIG. 1, in initial engagement conditions.

FIG. 4 shows a sectional view of the clutch 100, in initial engagement conditions. The "initial engagement" conditions correspond to medium-low rotational speeds of the engine, for example in the range 1800-2000 rpm for a motorcycle, depending on engine type.

In that, the configuration of the clutch in initial engagement conditions corresponds to the conditions of the vehicle in starting stage, at low advancement speed.

In "initial engagement" conditions, the mass element 212 is pushed radially outward by the centrifugal force acting on the centrifugal assembly 210, due to rotation of the clutch 100.

In that, the mass element 212 leaves the "rest" condition and assumes a radially rotated "intermediate" condition.

The bottom contact surface of the mass element 212 exerts an axial thrust on the pressure plate 209, thereby bringing the movable hub 202 closer to the fixed hub 201.

At the same time, the return spring 206 is compressed for this initial displacement of the mass element 212. Instead, the end-movement springs 214 remain substantially unaffected, because the return spring 206 has stiffness which is lower than the stiffness of the end-movement springs 214, so that the return spring 206 is first deformed by this initial movement.

In "initial engagement" conditions, the clutch 100 starts engaging, and the gap 410 between the movable hub 202 and the discs 204 is substantially reduced to zero.

The clutch 100 further comprises a pusher 401, configured for commanding manual disengagement of the clutch, which was previously omitted for better intelligibility, and which will be described with reference to following Figures.

Figure 5:
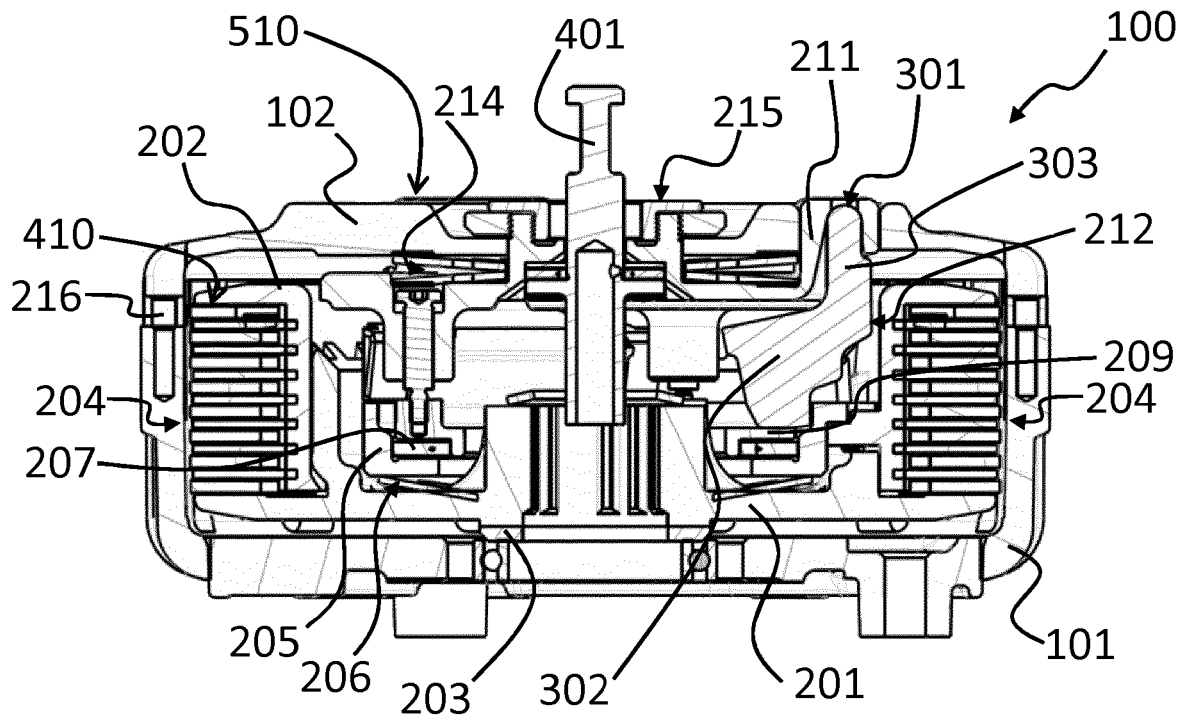
FIG. 5 shows a sectional view of the clutch of FIG. 1, in full engagement conditions.

FIG. 5 shows a sectional view of the clutch 100, in full engagement conditions. The "full engagement" conditions correspond to medium-high to high rotational speeds of the engine, for example in the range above 3000 rpm for a motorcycle, depending on engine type.

In that, the configuration of the clutch in full engagement conditions corresponds to the conditions of a travelling vehicle, at full advancement speed.

In full engagement conditions, the mass element 212 is pushed even more radially outward by the centrifugal force acting on the centrifugal assembly, due to rotation of the clutch 100.

In that, the mass element 212 assumes a radially rotated "complete" condition, reaching maximum radial displacement under centrifugal action. In particular, a surface of mass element 212 abuts against a surface of the mass holder 211, reaching an end-displacement position. No further radial displacement is possible for the mass element 212, whose further rotation is prevented by the abutment surface of the mass holder 211.

The bottom contact surface of the mass element 212 exerts a greater axial thrust on the pressure plate 209, thereby bringing the movable hub 202 closer to the fixed hub 201. In full engagement conditions, the clutch 100 is adapted for transmitting the maximum torque.

The specific axial load which arises, depends essentially on the geometry of the mass elements 212. It is advantageous that the maximum axial load is achieved with the complete rotation of the mass elements 212.

Since the discs 204 cannot be further compressed above a certain threshold, the end-movement springs 214 are provided in the centrifugal assembly. The end-movement springs 214 are interposed between the clutch cover 102 and the mass holder 211, and are compressed in "full engagement" conditions to allow complete rotation of the mass elements 212, while at the same time maintaining a reliable operation of the clutch 100.

In fact, the end-movement springs 214 are configured for partially counteracting the axial thrust provided by the rotated mass elements 212, without hindering the operation of the clutch.

Preferably, the setting means 215 allow to regulate preload of the end-movement springs 214, so as to provide a fine adjustment of the operating conditions of the clutch 100.

In a preferred embodiment, the mass holder 211 is configured for sliding with respect to the clutch cover 102, thereby achieving a (negative) gap 510 of about 0.75-1.00 mm, for allowing extra-clearance to the mass elements 212.

Preferably, two counter-facing Belleville or slotted disc springs are employed as end-movement springs 214, so as to provide adequate room for the maximum displacement of the mass element 212.

Figure 6:
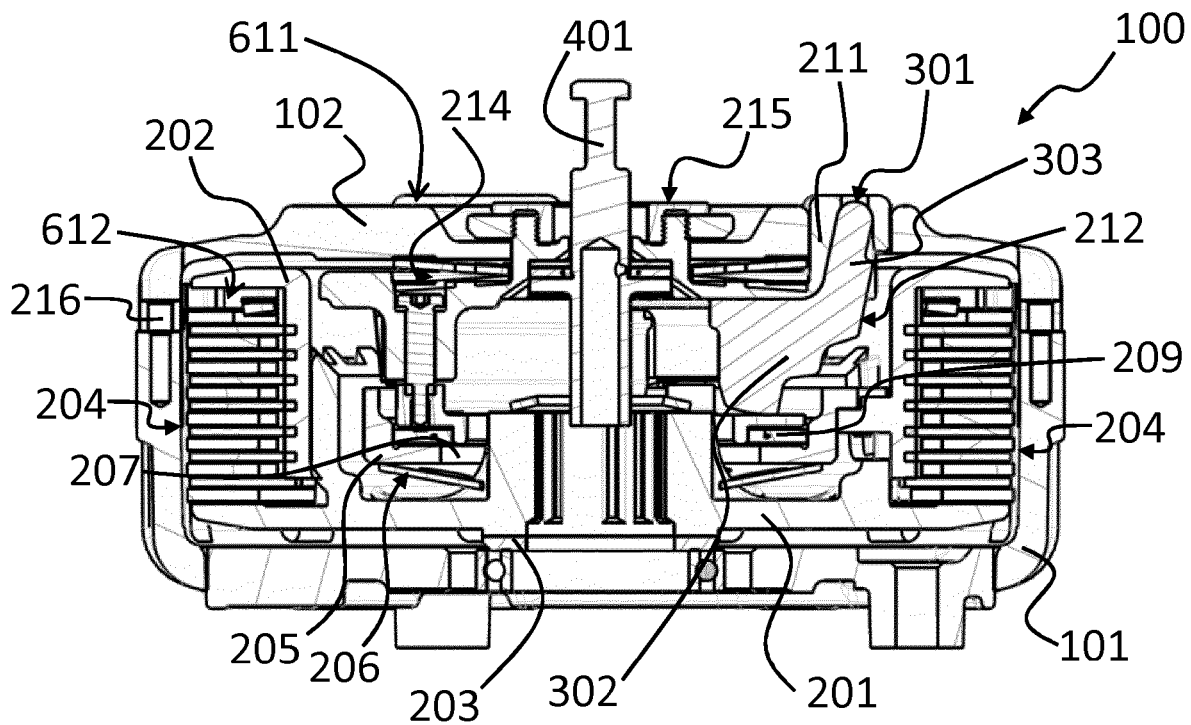
FIG. 6 shows a sectional view of the clutch of FIG. 1, in manual operation for idle rotational speeds.

FIG. 6 shows a sectional view of the clutch 100, in manual operation for idle rotational speeds. Once again, "idle" rotational speeds are for example in the range 1000-1400 rpm for a motorcycle, depending on engine type.

As described, the clutch 100 comprises a pusher 401 which allows manual commanding of the clutch. In particular, the pusher 401 can be actuated, typically by manual operation of a clutch lever, in order to raise the mass holder 211 and to distance it from the pressure plate 209. In particular, the mass holder is moved of a (negative) gap 611 of about 2.0 mm.

As mentioned, in a preferred embodiment, the mass holder 211 is configured for sliding with respect to the clutch cover 102, thereby achieving said (negative) gap 611 of about 2.0 mm.

By operating the pusher 401, lacking the action of the mass holder, the return spring 206 also raises the pressure plate 209 and the movable hub; a (negative) gap 612 is provided between the movable hub 202 and the discs 204, thereby disengaging the clutch. In particular, said (negative) gap 612 of about 3.5 mm is formed between the movable hub 202 and the discs 204.

At the same time, for idle conditions, the mass element 212 is radially inward in the centrifugal assembly. In particular, its inner radial surface abuts against the inner surface of the mass holder 211, since no centrifugal force arises. In this condition, the mass element 212 is in "rest" conditions.

The clutch remains in any case disengaged because of the action of the pusher 401.

In the preferred embodiment, the pusher 401 is external to the clutch 100; in an alternative engine mounting an internal pusher (or puller) passing through the driven shaft could be employed.

Figure 7:
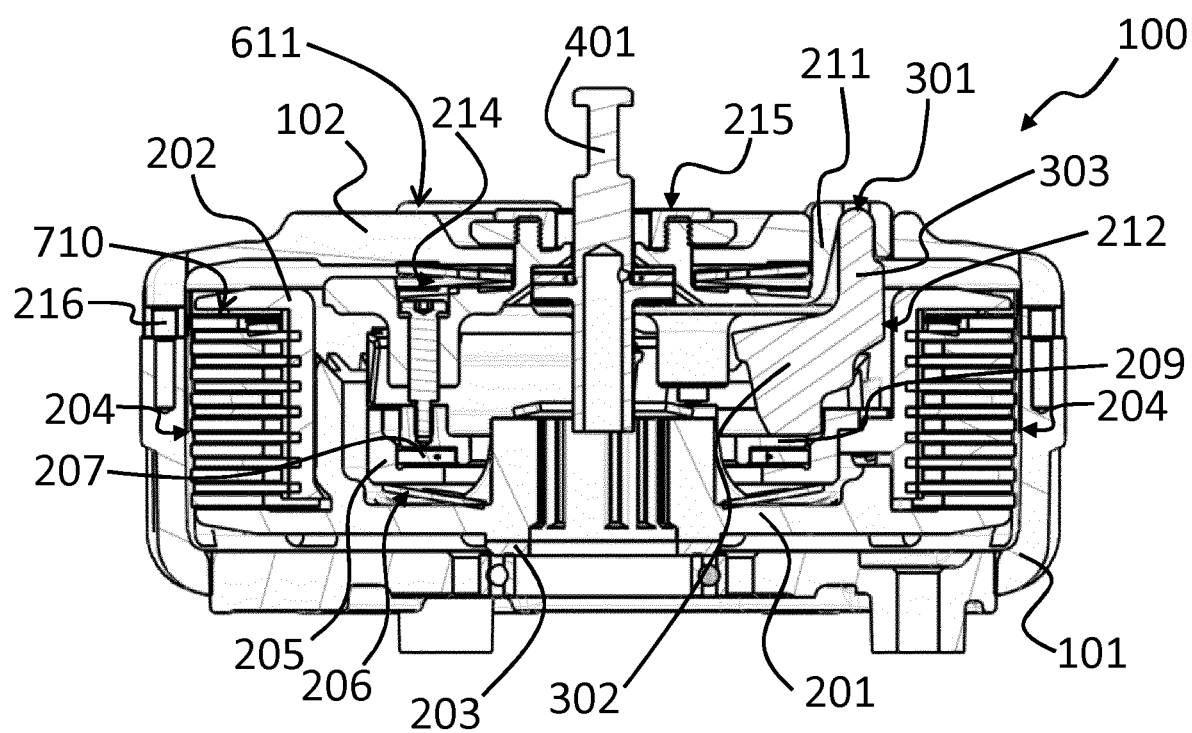
FIG. 7 shows a sectional view of the clutch of FIG. 1, in manual operation for medium-high rotational speeds.

FIG. 7 shows a sectional view of the clutch 100, in manual operation for medium-high to high rotational speeds. As described, medium-high to high rotational speeds of the engine, for example in the range above 3000 rpm for a motorcycle, depending on engine type, would correspond to the rotational speeds of "full engagement" above described.

Nonetheless, manual operation of the pusher 401 brings the clutch 100 in disengaged conditions. In that, the configuration of the clutch in manual operation for medium-high to high rotational speeds, corresponds, for example, to the conditions encountered during a gear change while the vehicle is travelling.

Due to high centrifugal forces, the mass elements 212 assume a radially rotated "complete" condition, reaching maximum radial displacement under centrifugal action. In particular, a surface of mass element 212 abuts against a surface of the mass holder 211, so that no further radial displacement is possible for the mass element 212. Once again, the bottom contact surface of the mass element 212 exerts an axial thrust on the pressure plate 209, thereby bringing the movable hub 202 closer to the fixed hub 201. Preferably, the movable hub 202 is moved downwards of about 2.5 mm due to rotation of the mass elements 212.

The end-movement springs 214 do not influence the engagement any longer, as they become compressed by the effect of the pusher 401 only.

The mass elements 212 must overcome only the reaction of the return spring 206 to reach complete rotation.

As the pusher 401 moves the mass holder of a (negative) gap 611, preferably of about 2.0 mm as above described, there remains an appropriate (negative) gap 710 between the movable hub 202 and the discs 204.

In fact, for example if the movable hub 202 is moved of a (positive) gap of about 2.5 mm by the completely rotated mass elements 212, and a (negative) gap of about 3.5 mm (1.5 mm of initial clearance and gap 611 of about 2.0 mm) was formed for idle conditions between the movable hub 202 and the discs 204, it remains still a (negative) gap 710 of about 1.0 mm which prevents clutch engagement when the pusher 401 is operated.

In general, the axial movement provided by the radial displacement under centrifugal effects of the mass elements 212 shall be less than: the axial movement provided by the pusher 401 plus an initial clearance of assembly.

The preload of the at least one end-movement spring 214 can be regulated by setting means 215, as described, thus setting appropriate clearance between the centrifugal assembly 210 and the pusher 401.

Therefore, the clutch 100 offers an automatic and a manual mode, which can be executed with full functionality simply by operating a clutch lever.

Figure 8:
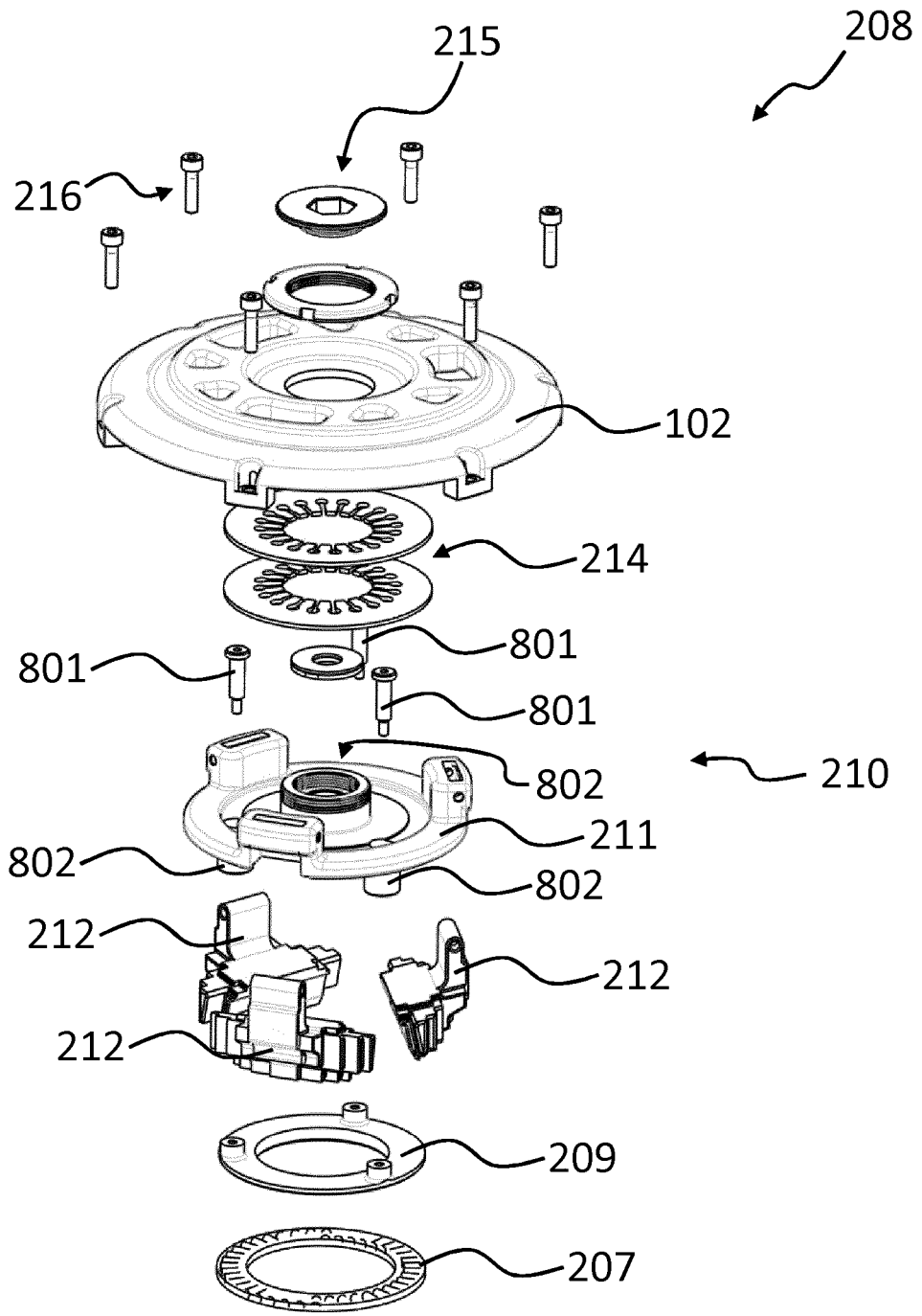
FIG. 8 shows an exploded view of a pressure plate assembly of a clutch according to the present invention.

FIG. 8 shows an exploded view of the pressure plate assembly 208 of the clutch 100, including the centrifugal assembly 210. As described, the pressure plate assembly 208 is configured for controlling the variable axial load acting on the moveable hub 202 and, in turn, on the discs 204, for selectively transmitting the torque.

In particular, the pressure plate 209 is configured for transmitting the variable axial load from the centrifugal assembly 210 to the moveable hub 202 (not shown), through the bearing 207.

The centrifugal assembly 210 further comprises a plurality of axial pins 801 which are offset with respect to the axis of rotation of the clutch, and which are mounted on the pressure plate 209, for example by threading into threaded holes thereon.

The lateral surface of the axial pins 801 is smooth, and the axial pins 801 are configured for passing through slots 802 of the mass holder 211, allowing joint rotation of the pressure plate 209 with the mass holder 211.

At the same time, the axial pins 801 allow a guided axial movement of the mass holder 211 with respect to the pressure plate 209, under the effects of the axial thrust provided by the interposed mass elements 212, when centrifugally displaced.

The axial pins 801 are thus configured for guiding the displacement movement of the mass elements 212 and to provide a balanced and symmetrical axial load acting on the movable hub 202. The axial pins 801 further allow joint rotation of the pressure plate 209 with the mass elements 212, so as to provide reliable operation of the clutch 100, and also avoid any rotational surface wear for the pressure plate 209.

Moreover, the axial pins 801 also provide advantages for assembly of the clutch 100, holding the centrifugal assembly 210 together. In any case, structural integrity of the clutch 100 could be achieved even without these axial pins 801, which remain optional elements.

In the preferred embodiment, the centrifugal assembly 210 comprises three mass elements 212, symmetrically disposed around the rotation axis in a 3-times-120° configuration. In an alternative embodiment, a different number of mass elements could be employed; for example, two opposed and suitable shaped mass elements could suffice; another embodiment could use six mass elements disposed in a 6-times-60° configuration. In general, the greater the number of the mass elements, the better the symmetry in the axial load is, to the expense nonetheless of a higher complexity of the centrifugal assembly, with more parts which occupy a larger space.

As mentioned, the clutch cover 102 is assembled to the housing 101 (not shown) by means of a plurality of screws 216. In the preferred embodiment, the mass holder 211 is constrained to the clutch cover 102 in order to rotate together with the housing 101 of the clutch 100. In an alternative embodiment, the mass holder could be linked to the housing, being drawn into rotation, by a separate component other than the clutch cover.

Figure 9:
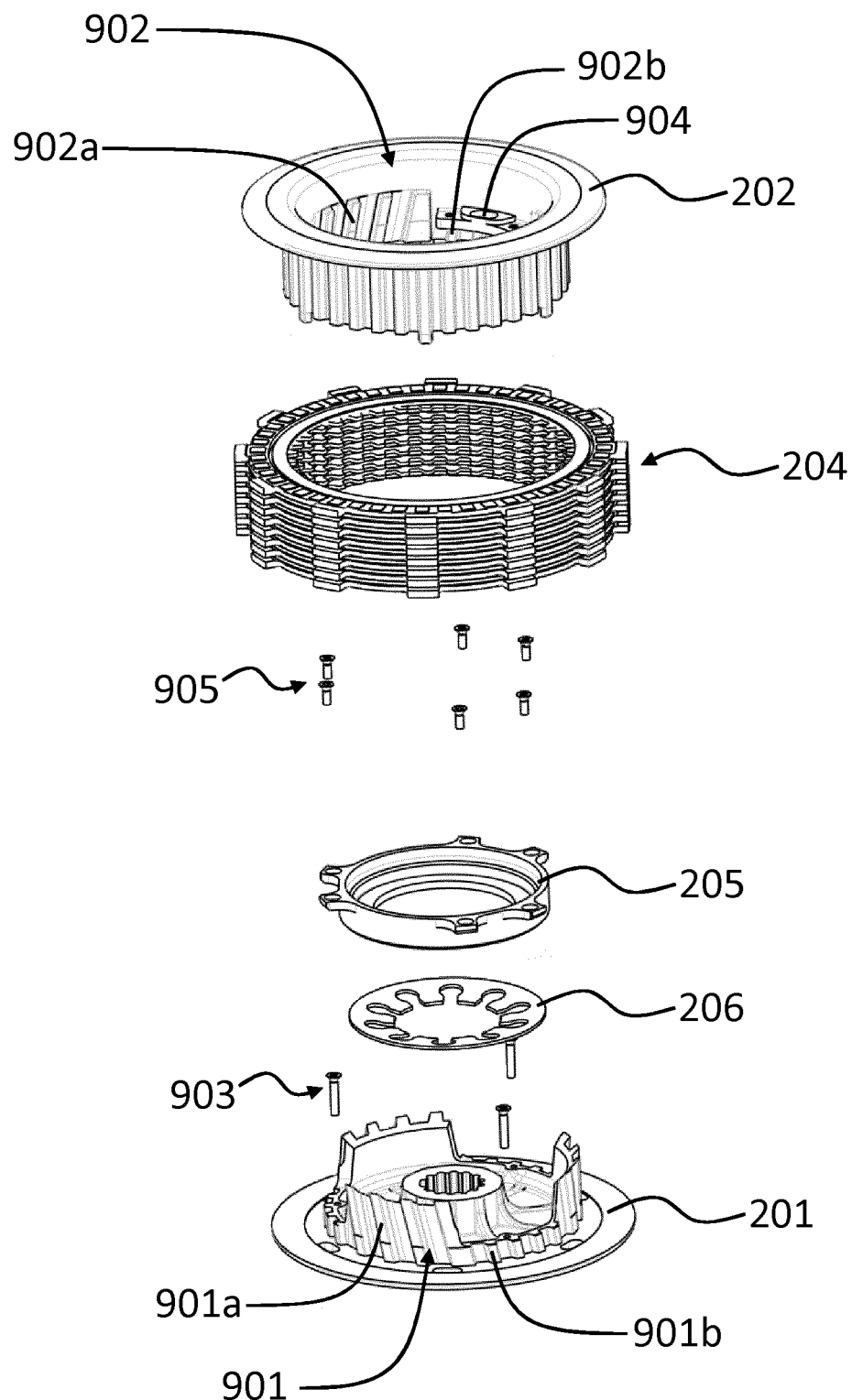
FIG. 9 shows an exploded view of a hubs assembly of a clutch according to the present invention.

FIG. 9 shows an exploded view of a hubs assembly of the clutch 100. The hubs assembly includes the fixed hub 201, the movable hub 202 and the plurality of discs 204.

The fixed hub 201 comprises a plurality of first sliding elements 901, which are sloped according to at least one helix, preferably on an outer surface. The movable hub 202 comprises a respective plurality of second sliding elements 902, preferably in an inner surface.

The first sliding elements 901 and the second sliding elements 902 are configured for mating with each other, so as to constrain the rotational and axial movements of the movable hub 202 with respect to the fixed hub 201.

The sloped sliding elements 901 and 902 are further configured for mutually sliding when the hubs assembly is subjected to a motoring or dragging torque, so as to increase or decrease the variable axial load acting on the discs 204.

The effect on the intensity of the axial load provided by the sliding elements 901 and 902, becomes an additional effect to the axial thrust provided by the centrifugal assembly above described. In other words, the clutch 100 provides two automatic contributions to the axial load acting on the discs 204: a first contribution represented by the axial thrust imparted by the centrifugal assembly, and a second contribution represented by the axial load provided by the sliding elements 901 and 902 under the effects of a torque acting on the hubs 201 and 202.

More in detail, by the configuration of the sliding elements 901 and 902, the fixed hub 201 and the movable hub 202 are configured to be pushed together when subjected to a driving torque, i.e. a torque provided by the vehicle engine; and are also configured to be pulled when subjected to a dragging torque, i.e. a torque which opposes to the torque supplied by the vehicle engine (typically, in a breaking stage of the vehicle).

Advantageously, this further axial load under driving torque provides an increase of axial load acting on the discs 204, by sliding of the hubs 201 and 202 on the helically grooved coupling of the sliding elements 901 and 902.

Oppositely, when a dragging torque is sufficiently higher than a driving torque (typically in a throttle-release phase or in a braking phase), the sliding elements 901 and 902 are configured for providing a reduction of axial load, thus counteracting the force of the centrifugal assembly, in a completely automatic manner.

The clutch 100, due to the sliding elements 901 and 902, therefore provides for an automatic functioning of assisting under driving torque, as well as a back-torque limiter automatic functioning, as in a "slipper clutch".

Advantageously, the sliding elements 901 and 902 allow smooth operation of the clutch 100, assisting and aiding the automatic functioning of the centrifugal assembly, both during clutch engagement and disengagement, thus making driving/riding experience more comfortable.

The at least one helix inclination of the sloped sliding elements 901 and 902 is a further calibration parameter of the clutch 100; if the sliding elements are more inclined, a greater axial load will be applied to the discs 204.

In a preferred embodiment, the sliding elements 901 comprise tall sliding elements 901a and short sliding elements 901b, and the sliding elements 902 comprise tall sliding elements 902a and short sliding elements 902b.

The tall sliding elements 901a and 902a comprise sliding surfaces sloped according to a first helix, configured to push together the fixed hub 201 and the movable hub 202, so as to increase the axial load, when subjected to a driving torque (in "wide open throttle" conditions).

The short sliding elements 901b and 902b comprise sliding surfaces sloped according to a second helix, configured to pull the fixed hub 201 and the movable hub 202, so as to reduce the axial load, when subjected to a dragging torque (in "motoring" conditions).

In the preferred embodiment, the driving torque is distributed over the tall sliding elements 901a and 902a, which have a greater surface than the short sliding elements 901b and 902b, over which the dragging torque is instead distributed.

In fact, the torque value during dragging (back-torque) is more limited than the torque value during driving torque, so that a more limited resisting section of the short sliding elements 901b and 902b is already capable to withstand the stresses arising under dragging torque, while a larger resisting section of the tall sliding elements 901a and 902a is needed to withstand the stresses arising under driving torque.

By providing separate back-sliding short elements 901b and 902b having a smaller size, compactness of the clutch 100 is achieved while maintaining reliability of the clutch assembly.

Preferably for motorcycles, the pitch of the helix of the sliding elements 901 and 902 is comprised between 500 mm and 2000 mm for oil bath clutches, more preferably between 900 mm and 1800 mm. For typical sizes of motorcycle clutches, this corresponds to an inclination of sliding elements ranging from 17° to 9°.

In general, the helical pitch value can be determined on the basis of operating characteristics desired for the clutch, and on the type of vehicle on which it is to be mounted.

In an alternative embodiment, the first helix of the tall sliding elements 901a and 902a may have an inclination which is different, in particular more inclined, than an inclination of the second helix of the short sliding elements 901b and 902b. By that, behavior of the clutch under the effects of the sliding elements 901 and 902, can be further optimized for conditions of driving torque or dragging torque.

Preferably, the fixed hub 201 and the movable hub 202 are connected by a plurality of axial pins 903, which are threaded into the fixed hub 201 and pass through respective slots 904 in the movable hub 202. In particular, the slots 904 have elliptical cross section, so as to allow the helical movements of the hubs on the sliding elements, as above described.

As described, the hubs assembly comprises the bottom-side pressure plate 205 which is joined to the movable hub 202 by a plurality of screws 905 (which remain optional). The bottom-side pressure plate 205 is configured for receiving the axial thrust provided by the pressure plate 209 (not shown); in that, the bottom-side pressure plate 205 remains a "passive" element of the movable hub 202.

In an alternative embodiment, the bottom-side pressure plate 205 could be modified or made in one single piece with the movable hub 202, as far as the latter remains adapted to receive the axial thrust from the pressure plate assembly.

Figure 10:
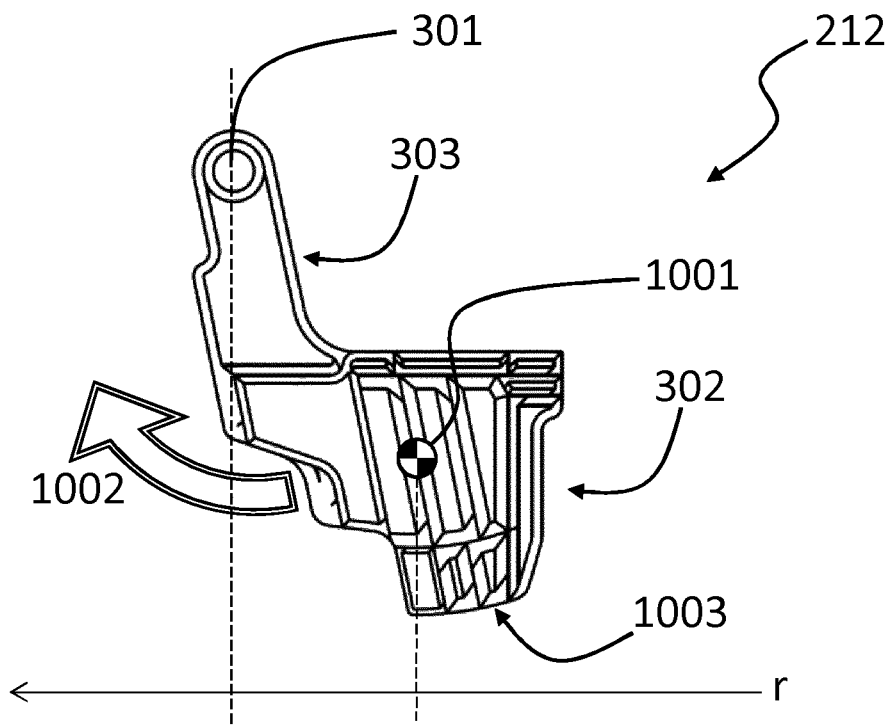
FIG. 10 shows a side view of a mass element of a clutch according to the present invention.

FIG. 10 shows a side view of the mass element 212. As described, the mass element 212 comprises a pivot 301, a main body 302 and a column element 303 which connects the pivot 301 with the main body 302.

The pivot 301 defines a rotation coupling with respect to the mass holder 211 (not shown). Preferably, a plurality of rotation pins can be provided between the pivot 301 and its seat; otherwise, the curved shape of the pivot 301 could suffice for providing a rotational fulcrum for the mass element 212.

The column element 303 is a substantially elongated and upright element, which is configured for increasing a lever's arm in the displacement under centrifugal effects of the mass element 212.

In particular, a centrifugal force will act transversally on the center of mass 1001 of the mass element 212 (set into an exemplifying position). The column element 303 provides a longer distance ("lever's arm") from the center of mass 1001 ("load point") and the pivot 301 ("fulcrum"), thus increasing a lever's arm. By increasing the lever's arm, the displacement movement under centrifugal effects, exemplified by arrow 1002, is facilitated, which is then converted more effectively into an axial thrust imparted by the profiled contact surface 1003 on the bottom of the mass element 212.

The center of mass 1001 is located within the main body 302, as the latter holds the majority of the mass in the mass element 212. Preferably, the column element 303 defines a pivot 301 which is radially more external, along the radius "r", than the center of mass 1001 with respect to the rotation axis of the clutch (on the right-hand side, in FIG. 10). By having a pivot 301 which is radially more external, centrifugal force acting on the mass element 212 may be increased, because a larger mass is located at an outer radius, thereby increasing centrifugal acceleration. In that, the displacement under centrifugal effects of the mass elements 212 can be further optimized.

Moreover, by having a pivot 301 which is radially more external, more room for housing internal components of the clutch 100 becomes available towards the center, thereby increasing compactness of the system.

In alternative embodiments (not shown), the pivot could be aligned with, or even more internal than, the center of mass.

In general, the profiled contact surface 1003 has a variable curvature radius, which is configured for exerting the axial thrust. For example, the profiled contact surface 1003 has a "cam-like" shape. In particular, the distance between the pivot 301 and the outermost point of the profiled contact surface 1003 shall increase, during displacement of mass element along direction 1002.

Moreover, the profiled contact surface 1003 is configured to bring back the mass elements 212 to "rest" conditions, once the rotational speed of the clutch becomes lower than a threshold, so as to disengage the clutch, for example for stopping the vehicle.

In particular, the profiled contact surface 1003 of the mass element 212 is configured to return to "rest" conditions, also thanks to the effects of the end-movement springs 214, preferably having higher stiffness, together with the action of the return spring 206 transferred by the pressure plate 209, preferably having lower stiffness.

Figure 11:
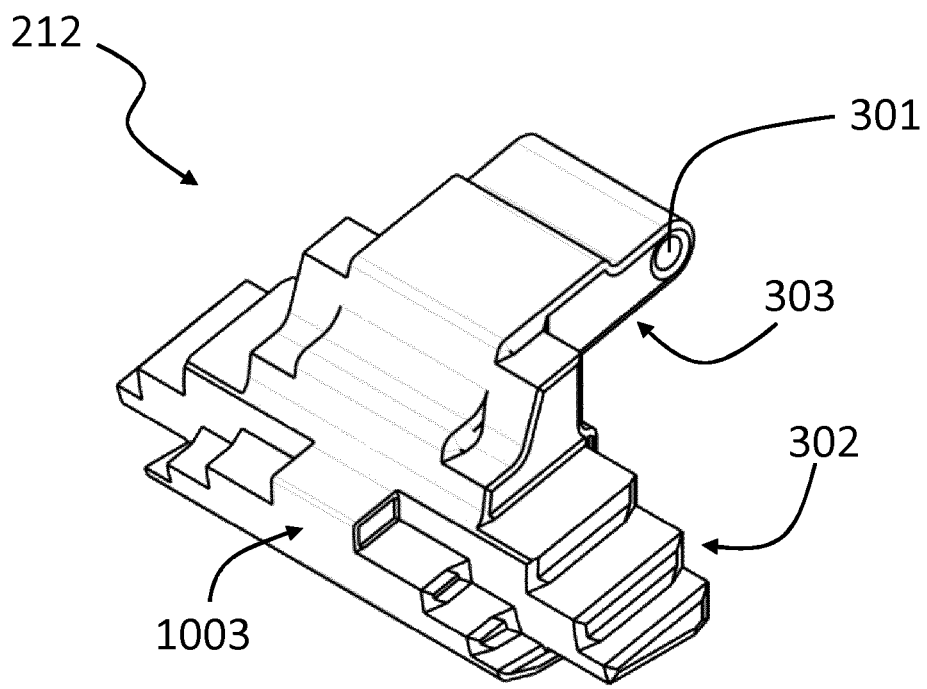
FIG. 11 shows a prospective view of the mass element of FIG. 10.

FIG. 11 shows a prospective view of the mass element 212. In the preferred embodiment, the main body 302 comprises a step-like shape, which maximizes the occupied volume, and thus the mass located in the main body 302, increasing the centrifugal force acting thereon. In this way, a more compact centrifugal assembly can be provided.

In a further embodiment of the mass element (not shown), rubber elements could be provided in order to increase friction effects, and prevent early displacement below a certain rotational speed of the clutch.

Figure 12:
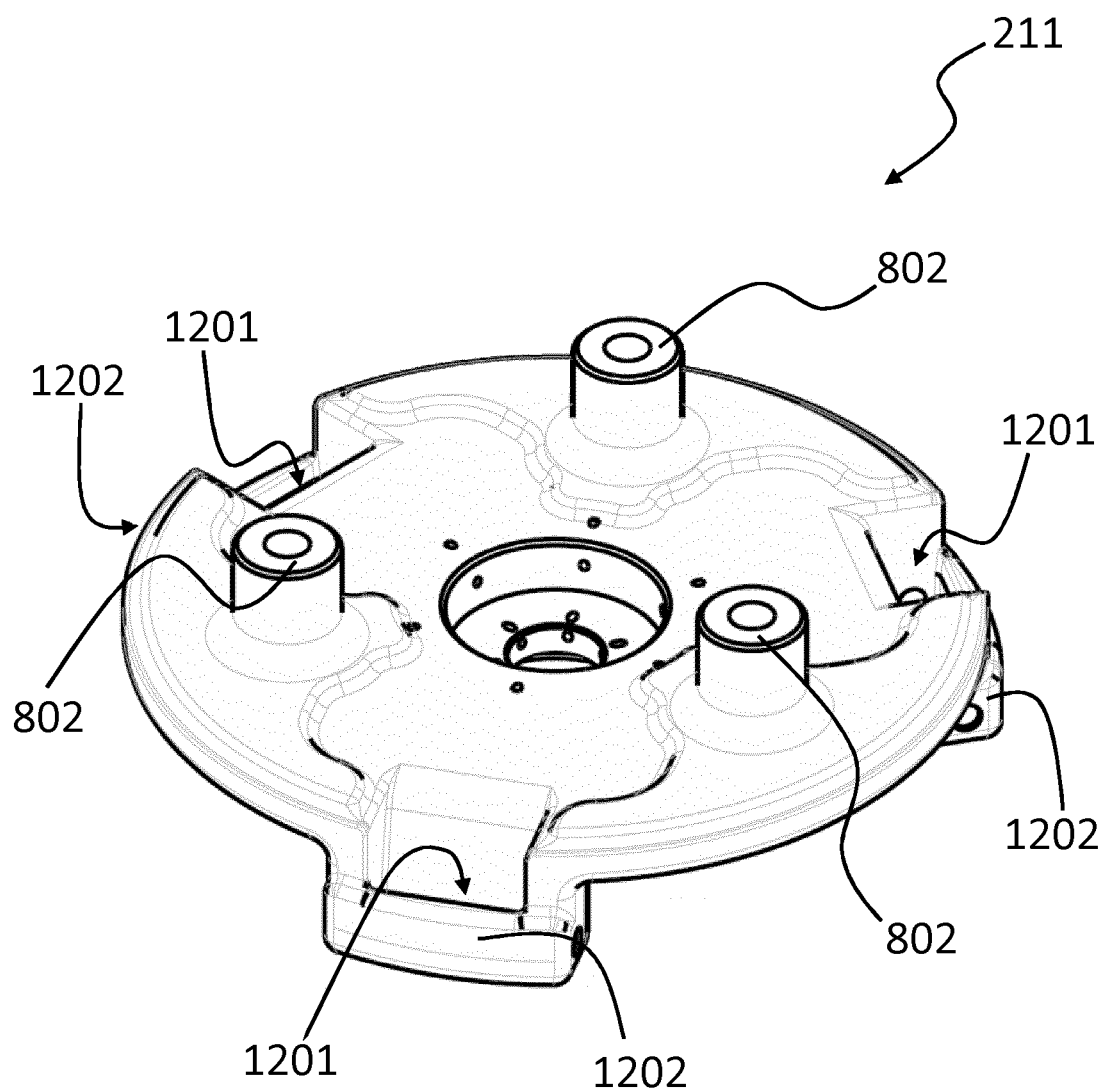
FIG. 12 shows a mass holder of a clutch according to the present invention.

FIG. 12 shows the mass holder 211. The mass holder 211 is configured to rotate jointly with the housing 101 (not shown) and to carry the mass elements 212 (not shown) in order to rotate them around the rotation axis.

The mass holder 211 comprises a plurality of pivot seats 1201 for the pivots 301 of the mass elements 212. The mass elements 212 are thus configured to rotate in such pivot seats 1201, for the displacement under centrifugal effects as described.

The pivot seats 1201 are preferably provided in a plurality of corresponding protruding structures 1202, each of them being configured for the insertion of a respective column element 303.

By providing protruding structures 1202 in the mass holder 211, a more compact configuration of the clutch 100 is achieved; in fact, the column elements 303 can be accommodated therein, while leaving room for additional elements of the clutch 100, in the center of the mass holder 211. Such additional elements are for example the setting means 215 and the end-movement springs 214.

Figure 13:
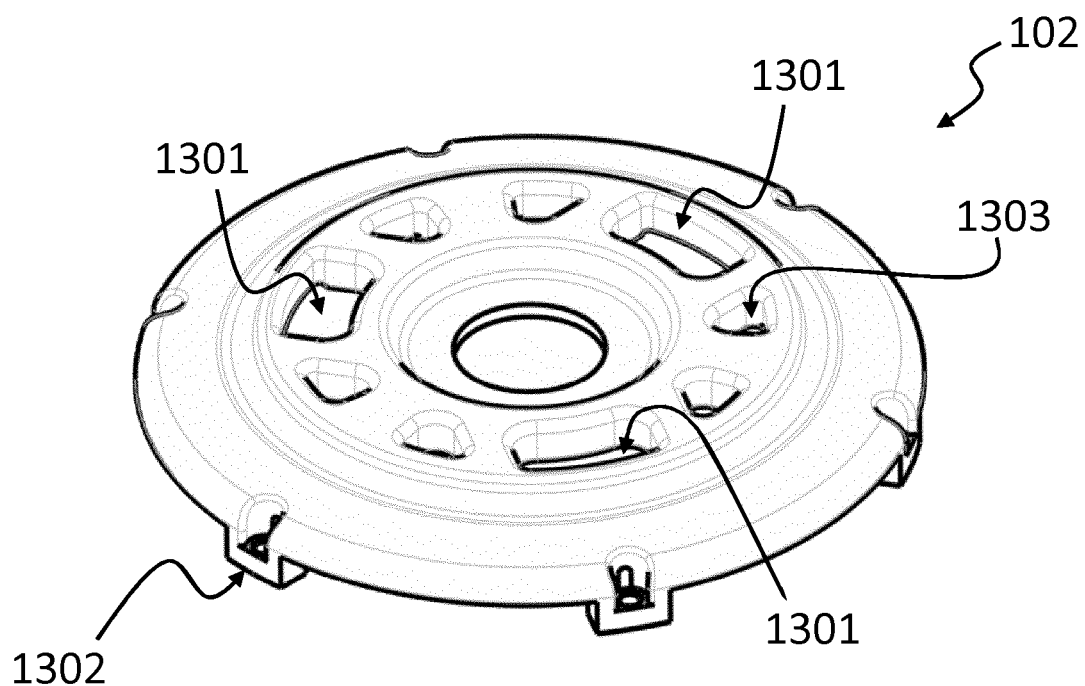
FIG. 13 shows a cover element of a clutch according to the present invention.

FIG. 13 shows the clutch cover 102. The clutch cover 102 comprises a plurality of recesses, in particular through holes 1301.

The through holes 1301 are configured for respectively accommodating the plurality of protruding structures 1202 of the mass holder 211. Therefore, the connection between the through holes 1301 and the protruding structures 1202, allows joint rotation of the mass holder 211 with the clutch cover 102, which is in turn connected to the housing 101 by means of bolted connections 1302. Thereby, by rotating the clutch 100, a centrifugal force arises within the centrifugal assembly 210, as described.

The through holes 1301 are further configured for allowing a sliding movement of the protruding structures 1202, during operation of the clutch, as described with reference to FIGS. 3 to 7. In fact, it can be seen that the distance between the mass holder 211 and the clutch cover 102 changes, with the protruding structures 1202 sliding into the recesses 1301, thereby allowing compression of the end-movement springs 214.

In an alternative embodiment of the clutch cover, the recesses could be closed on the outer side of the clutch, with the clutch cover being consequently thicker.

Preferably, the clutch cover 102 includes further openings 1303 which are provided for lubrication.

Figure 14:
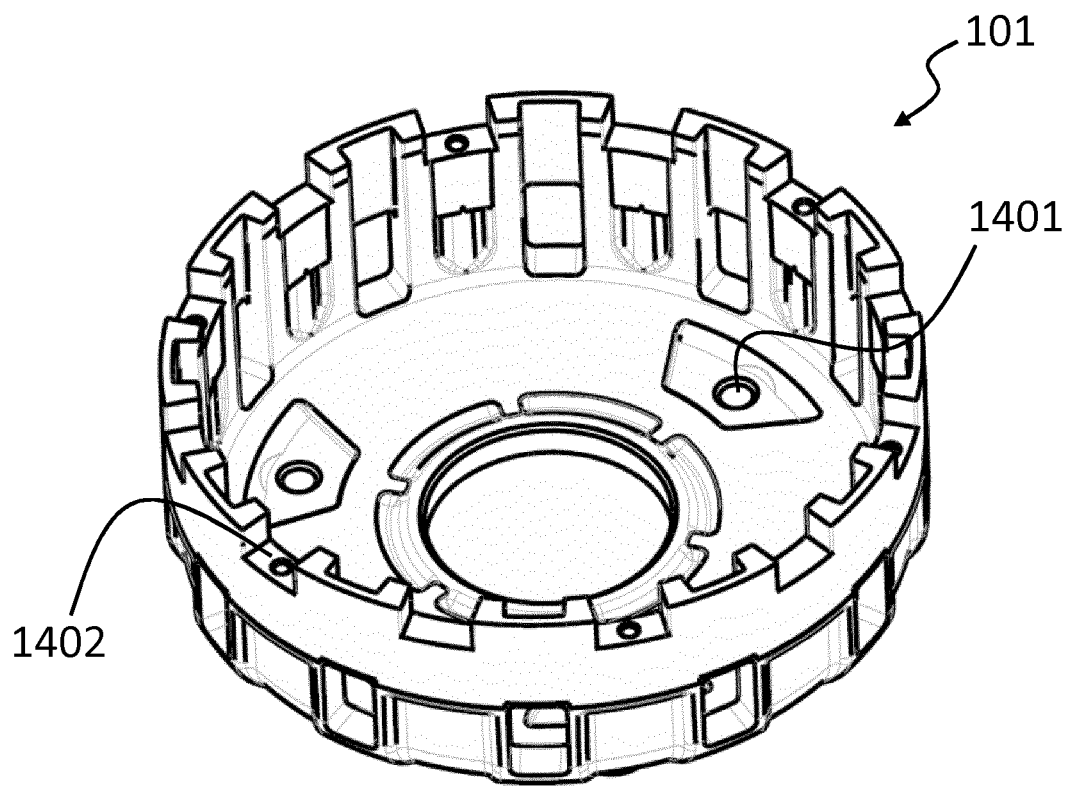
FIG. 14 shows a housing of a clutch according to the present invention.

FIG. 14 shows the housing 101, which preferably comprises a plurality of holes 1401 for connection to a primary gear through an optional damper.

The housing 101 further comprises a plurality of slots 1402 configured to mate with the bolted connections 1302, in order to ensure joint rotation of the clutch cover 102 with the housing 101, as described.

The present invention has been described with reference to a motorcycle clutch 100, which represents a non-limiting example.

The skilled in the art, considering the present disclosure, could envisage further modifications of the clutch according to the present invention, to suit specific needs.

For example, it is possible to adapt the clutch according to the present invention to different requirements, that depend upon the specific application and upon the motor vehicle (motorcycle, car, truck, and so on) on which it is to be installed.

The number and arrangement of the mass elements and/or the number and stiffness of the various spring elements can be varied in order to adapt the clutch to a particular application. In particular, different spring elements, other than Belleville springs, could be employed if the clutch configuration so allows.

Moreover, the configuration of the sliding elements 901 and 902 may be modified to meet specific design requirements.

Advantageously, the behavior of the clutch can be regulated by changing the spring elements provided, but also by simply operating the setting means 215, for "fine tuning" of the clutch; the performance of the clutch can be therefore optimized.

Further advantages of the clutch according to the present invention, include the possibility of manual operation thereof, available together and at the same time with the automatic operation by the centrifugal assembly.

Manual operation could nonetheless be excluded.

It is also noted that that the present invention could apply to clutches of the dry type or of oil-bath type.

What is claimed is:

1. A clutch comprising:
    a housing rotatable around an axis of rotation;
    a fixed hub internal to said housing and configured for coupling with a shaft coaxial to said axis of rotation;
    a movable hub axially mounted along said axis of rotation onto said fixed hub and configured to rotate jointly with said fixed hub;
    a plurality of discs interposed between said fixed hub and said movable hub;
    wherein said fixed hub and said movable hub are further configured to axially slide, getting farther or closer to each other so as to transmit a variable axial load onto said plurality of discs, thereby selectively transmitting a torque from said housing to said shaft;
    said clutch further comprising a pressure plate assembly for controlling said variable axial load, said pressure plate assembly including a centrifugal assembly comprising:
    a mass holder configured to rotate jointly with said housing;
    a plurality of mass elements radially disposed in said mass holder around said axis of rotation;
    wherein each mass element comprises a pivot and is configured for a displacement under centrifugal effects by pivoting around said pivot;
    wherein said plurality of mass elements, in said displacement under centrifugal effects, are further configured for exerting an axial thrust within said pressure plate assembly, to bring said movable hub closer to said fixed hub, so as to increase said variable axial load;
    wherein each mass element comprises a main body and a column element connecting said pivot with said main body;
    wherein said column element is a substantially elongated and upright element, configured for increasing a lever's arm in said displacement under centrifugal effects;
    said mass element having a center of mass within said main body, wherein said pivot is radially more external than said center of mass with respect to said axis of rotation.

2. The clutch according to claim 1, wherein said main body comprises a step-like shape for maximizing occupied volume.

3. The clutch according to claim 1, wherein each mass element comprises a profiled contact surface having a variable curvature radius configured for exerting said axial thrust.

4. The clutch according to claim 1, wherein said mass holder comprises a plurality of pivot seats in corresponding protruding structures, each protruding structure being configured for insertion of each column element.

5. The clutch according to claim 4, further comprising a clutch cover connected to said housing, wherein said clutch cover comprises a plurality of recesses or through holes, for respectively accommodating said plurality of protruding structures, thereby joining rotation of said housing and said mass holder.

6. The clutch according to claim 5, wherein said centrifugal assembly further comprises at least one end-movement spring, interposed between said clutch cover and said mass holder, said at least one end-movement spring being configured for partially counteracting said axial thrust upon reaching a threshold of variable axial load.

7. The clutch according to claim 6, wherein said protruding structures are further configured for respectively sliding into said recesses, thereby allowing compression of said at least one end-movement spring.

8. The clutch according to claim 6, wherein said centrifugal assembly further comprises setting means for regulating preload of said at least one end-movement spring.

9. The clutch according to claim 1, wherein said pressure plate assembly includes a pressure plate configured for transmitting said variable axial load from said centrifugal assembly to said movable hub, and wherein said centrifugal assembly further comprises a plurality of axial pins offset with respect to said axis of rotation, mounted on said pressure plate and passing through said mass holder, so as to allow joint rotation of said pressure plate and of said mass holder, and further to allow axial movement of said mass holder with respect to said pressure plate due to said axial thrust.

10. The clutch according to claim 9, further comprising at least one return spring configured for counteracting the movement of said pressure plate.

11. The clutch according to claim 1, wherein said fixed hub comprises first sliding elements, sloped according to at least one helix, and wherein said movable hub comprises second sliding elements, sloped according to said at least one helix, said first sliding elements and said second sliding elements being configured for mating with each other and for mutually sliding when subjected to a driving or dragging torque, so as to respectively increase or decrease said variable axial load.

12. The clutch according to claim 11, wherein said first sliding elements and said second sliding elements are sloped according a first helix for said driving torque, and according to a second helix for said dragging torque.

13. The clutch according to claim 1, further comprising a pusher configured for commanding manual disengagement of said clutch, by distancing said mass holder from said movable hub.

14. The clutch according to claim 6, wherein said at least one end-movement spring includes a pair of counter-facing Belleville springs.

* * * * *